Figure 1:
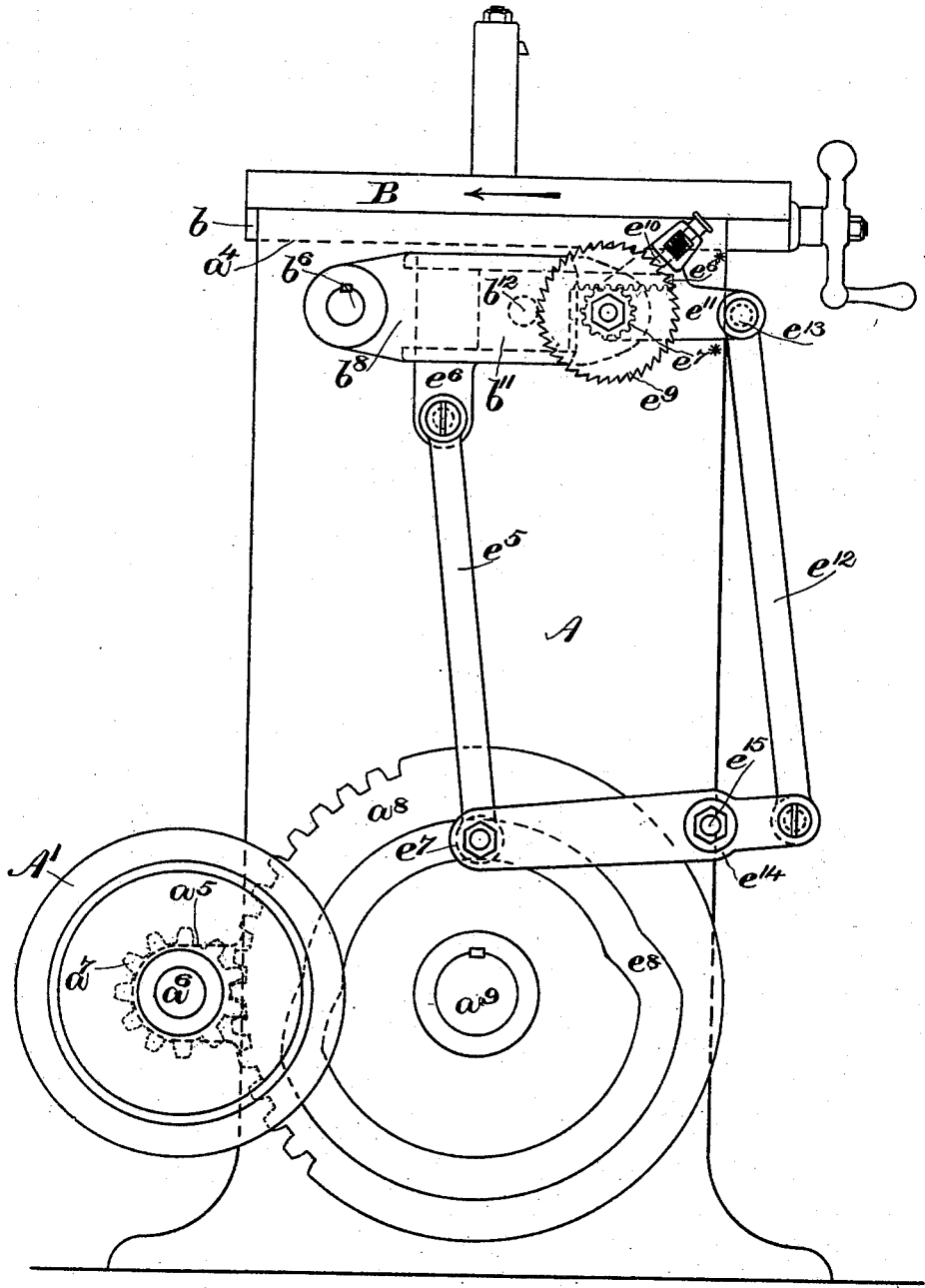

(No Model.)

A. H. MORTON.
OIL GROOVE CUTTING MACHINE.

No. 596,528.  Patented Jan. 4, 1898.

4 Sheets—Sheet 1.

WITNESSES:
INVENTOR
Albert H. Morton,
BY
Phillips & Anderson
ATTORNEYS (No Model.) 4 Sheets—Sheet 2.
A. H. MORTON.
OIL GROOVE CUTTING MACHINE.
No. 596,528. Patented Jan. 4, 1898.
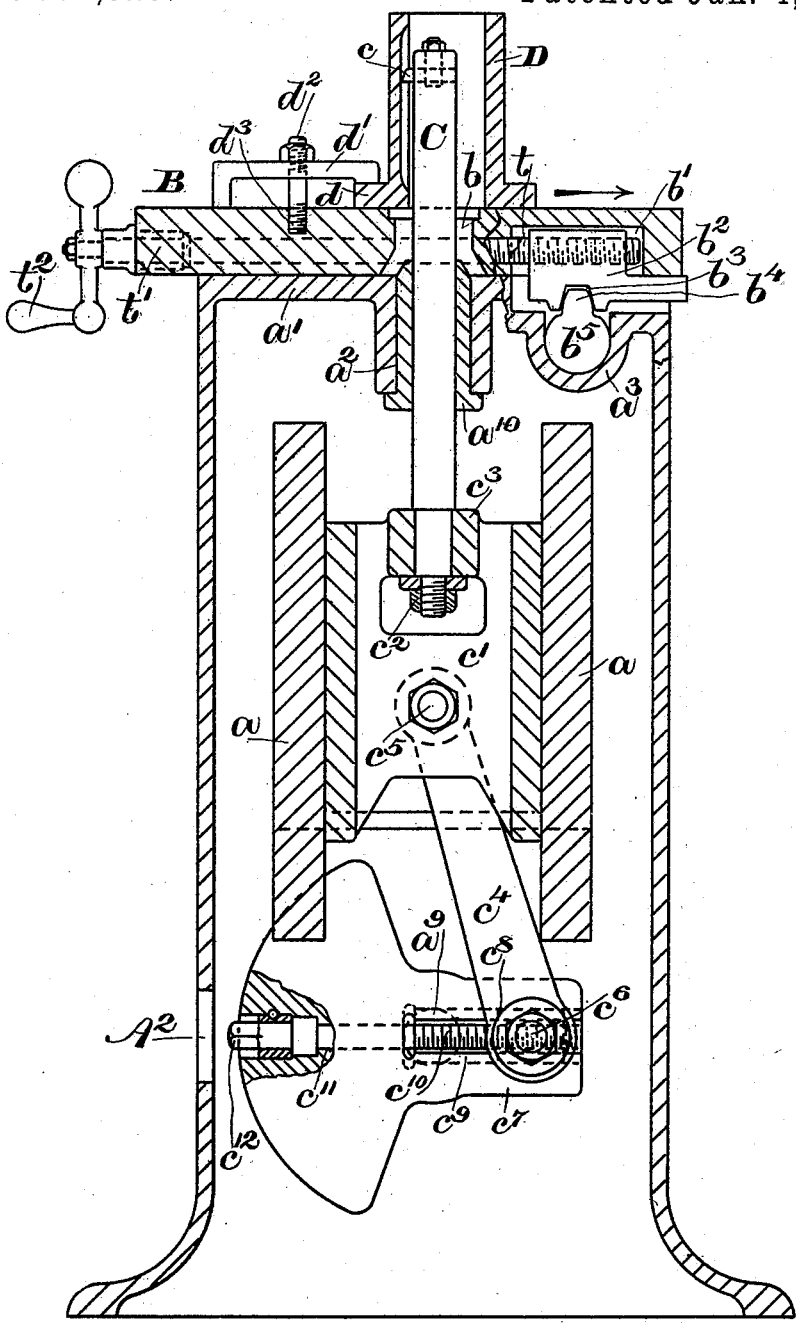
FIG_2_
WITNESSES:
INVENTOR
Albert H. Morton,
BY
Phillips Henderson
ATTORNEYS.

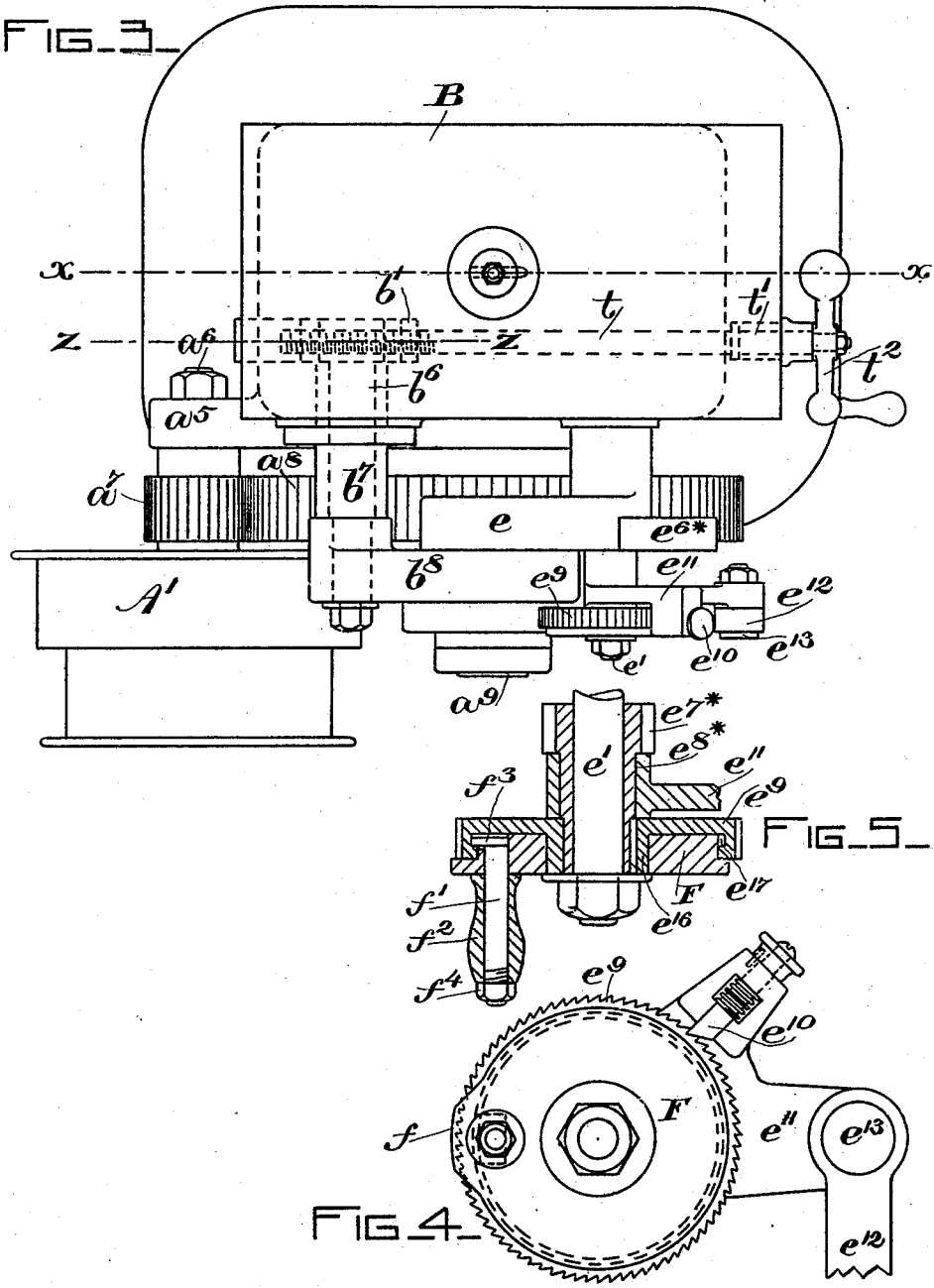

(No Model.) 4 Sheets—Sheet 4.
A. H. MORTON.
OIL GROOVE CUTTING MACHINE.
No. 596,528. Patented Jan. 4, 1898.
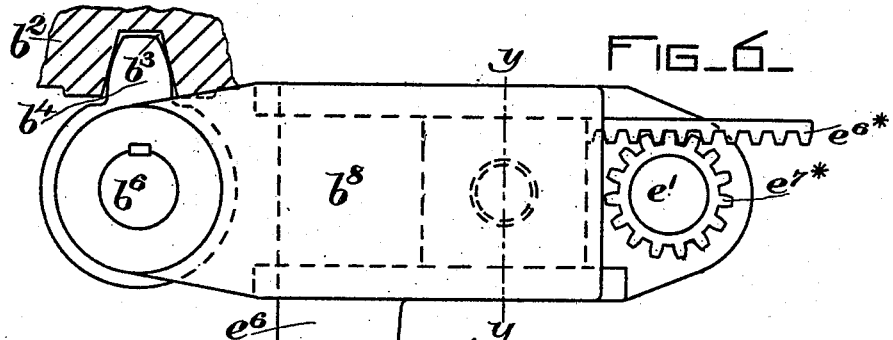
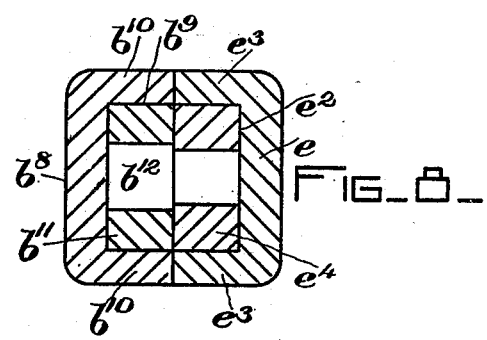
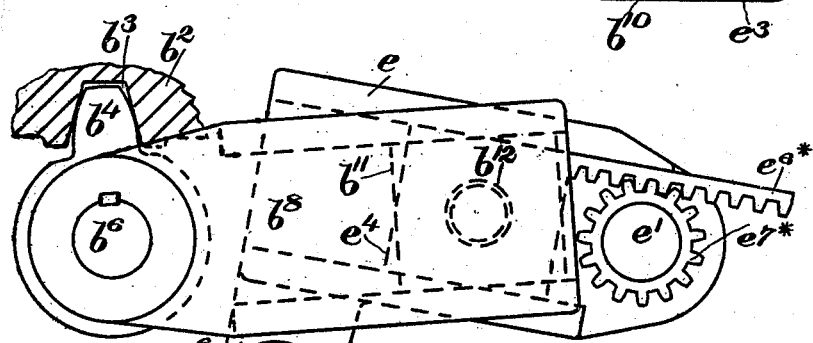
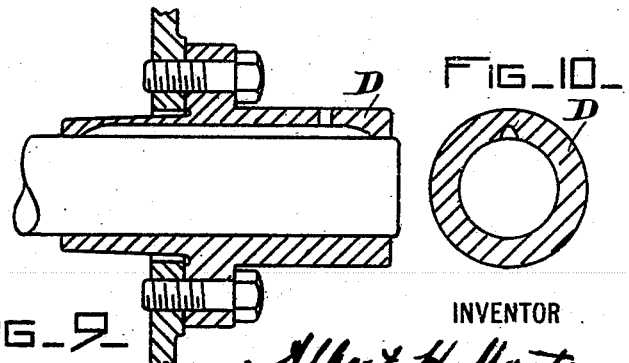
WITNESSES:
INVENTOR
Albert H. Morton,
BY
Phillips & Henderson
ATTORNEYS.

UNITED STATES PATENT OFFICE.

ALBERT H. MORTON, OF LOWELL, MASSACHUSETTS.

OIL-GROOVE-CUTTING MACHINE.

SPECIFICATION forming part of Letters Patent No. 596,528, dated January 4, 1898.

Application filed April 14, 1897. Serial No. 632,057. (No model.)

*To all whom it may concern:*

Be it known that I, ALBERT H. MORTON, a citizen of the United States, residing at Lowell, in the county of Middlesex and State of Massachusetts, have invented certain new and useful Improvements in Oil-Groove-Cutting Machines; and I do hereby declare the following to be a full, clear, and exact description of the invention, such as will enable others skilled in the art to which it appertains to make and use the same.

It is common in the art to provide a tubular bearing with what is commonly termed an "oil-groove," which is located within the bearing and extends longitudinally thereof, being, however, of a length less than the length of the bearing and terminating at points removed from the ends of the bearing. The function of this groove is to distribute oil along the bearing and retain oil for lubricating the bearing, and said groove communicates with the outside of the bearing by one or more oil-holes, through which the oil is inserted therein. Owing to the location of the oil-groove within the bearing and to the fact that it terminates at points removed from the ends of the bearing, it has not been proposed, in so far as I am at present advised of the art, to cut such a groove by the use of any machine without largely supplementing the operation of such machine by hand labor, and it is the common practice in the art to cut such groove entirely by hand with a hammer and cold-chisel, the operation being difficult and expensive.

The object of the present invention is to provide a machine for forming such grooves and for analogous purposes which shall not require the constant interference of the operator and which will successfully and expeditiously perform the work required.

To the above end the present invention consists of a cutting-tool arranged to project within the bearing to be grooved, a work-support upon which the bearing is held, and connected mechanisms operating automatically to impart to the tool and work-support relative longitudinal and lateral movements to cause said tool to cut a groove upon the inner face of the bearing of a length less than the length of the bearing.

The present invention further consists of improvements in the form and arrangement of said mechanism, whereby the relative lateral movements of the tool and work-support shall be to a fixed point in one direction and to a progressively-advancing point in the opposite direction.

The present invention further consists of means for controlling the relative lateral movements of the tool and work-support, whereby the tool is caused to engage with the inner surface of the bearing while making a cut and to disengage itself therefrom during the return movement.

The present invention also consists of mechanism for controlling the relative lateral movement of the tool and work-support to regulate the depth of the cut and to stop the progressively-advancing movement at a predetermined point.

The present invention further consists of the devices and combination of devices hereinafter described and claimed.

A preferred form of the present invention is shown in the accompanying drawings, in which—

Figure 1 shows the machine in side elevation. Fig. 2 shows a section of the machine, taken upon the lines *x x* and *z z*, Fig. 3, parts being in elevation. Fig. 3 shows a plan view of the machine. Fig. 4 illustrates a side elevation of the work-support feed-controlling mechanism. Fig. 5 represents a transverse section of the same mechanism. Figs. 6 and 7 represent details of the work-support-actuating mechanism. Fig. 8 represents a section upon the line *y y*, Fig. 6. Fig. 9 shows a fragmentary detail of a shaft and bearing, the bearing being provided with an oil-groove, such as cut by this machine; and Fig. 10 shows a transverse section of said bearing.

Before proceeding to describe the present machine I desire to state that I am not aware that it has ever been proposed to make a machine for cutting a longitudinal groove upon the inner face of a tubular article or bearing of a length less than the length of the bearing and terminating at each end at a point removed from the end of the bearing without largely supplementing the operations of such machine by hand labor, and that therefore I do not consider the present invention as limited to the precise details of construction shown, nor to giving to the tool or work-support the movements which will be described, inasmuch as it is obvious that the tool itself may be given all the movements required to make the cut, the work-support remaining fixed, or the tool may remain fixed and the work-support given all the movements required to make the cut.

In the machine of the drawings the cutting-tool has imparted to it a longitudinal reciprocating movement within the bearing in which the groove is to be cut, and the work-support has imparted to it a laterally-reciprocating movement, such movement being to a fixed point in one direction and progressively advancing in the opposite direction, whereby the tool will gradually cut the groove to the required depth.

In the machine of the drawings, A represents a frame of suitable size and shape to support the working parts, said frame being substantially a hollow casting rectangular in cross-section and provided with suitable braces $a$ upon its interior, as shown in Fig. 2. The upper end of the frame A is closed by a top $a'$, which is provided with an aperture $a^2$ and a bearing $a^3$ for a purpose to be hereinafter described. Upon the upper surface of the top $a'$ is formed a suitable guideway $a^4$, within which is received and guided a suitable guide $b$ of the work-table B. Upon frame A is also formed a suitable bearing $a^5$, which carries a stud $a^6$, upon which is mounted the driving-pulley A′, and a pinion $a^7$, said pulley and pinion communicating motion to the parts of the machine through the gear $a^8$, mounted upon the end of a shaft $a^9$, turning in a suitable bearing in the side of frame A.

The tool $c$ is carried by the upper end of a tool-stock C, which is shown as a cylindrical rod or stem mounted to reciprocate in a bushing $a^{10}$, fitted to the aperture $a^2$ in the top $a'$ of the frame A. Any suitable means may be provided for imparting a reciprocating movement to the tool-stock C, that shown in the machine of the drawings being as follows: Fitted between the braces $a$ $a$ and guided thereby is a reciprocating cross-head $c'$, to the upper end of which said tool-stock C is rigidly and securely fixed in any suitable manner, as by the nut $c^2$ engaging the threaded end of said tool-stock, which projects below the end of the bearing $c^3$, formed in said cross-head, into which the lower end of said tool-stock is fitted. The cross-head $c'$ is reciprocated by means of a link $c^4$, which is pivotally connected at $c^5$ to said cross-head and at its other end pivotally connected to a crank-pin $c^6$, carried by a crank $c^7$, mounted upon the inner end of the shaft $a^9$. The crank $c^7$ is preferably counter-weighted, as shown, in order to insure ease and regularity of action. The above-described arrangement is such that a rotation of the shaft $a^9$ will, by means of the crank $c^7$, crank-pin $c^6$, and link $c^4$, impart a vertical reciprocation to the cross-head $c'$, thus reciprocating the tool-stock C and the tool $c$, carried thereby.

It may be desirable to regulate and adjust the reciprocation of the tool-stock C and the tool $c$ for the purpose of varying the length of the cut made by said tool, and this may be accomplished by any suitable mechanism, conveniently by mounting the crank-pin $c^6$ upon a slide $c^8$, which is adapted to move along a guideway $c^9$, formed in the crank $c^7$, said slide being actuated by a threaded rod $c^{10}$, engaging a threaded bearing in said slide $c^8$, said rod $c^{10}$ being fitted to turn in a bearing $c^{11}$, but restrained from longitudinal movement by any suitable means and having a suitable head $c^{12}$, by which it may be engaged and turned to move said slide $c^8$ and crank-pin $c^6$ to any desired position along said crank $c^7$. Any suitable provision may be made in the frame A for the purpose of obtaining access to the rod $c^{11}$ for the purpose of adjusting the crank-pin $c^6$—as, for instance, an aperture $A^2$ may be provided in said frame, as shown in Fig. 2. The bearing within which the groove is to be cut is mounted upon the work support or table B, and said table is given a reciprocating movement to bring said bearing into engagement with the tool $c$ when said tool is moving in a direction to make the cut and to remove said work from engagement with the tool $c$ when said tool is moving in the opposite direction.

As clearly shown in the drawings, the work support or table B has an enlarged central aperture $b$, through which the tool-stock C is adapted to be reciprocated, said aperture $b$ being of such a diameter as to permit a limited reciprocation of the work support or table B without interfering with the movements of the tool-stock C. The bearing D to be cut is fixedly held upon the surface of the work support or table B by any suitable means, as by a clamp $d'$, which is caused to engage and tightly clamp some portion of the bearing D, which in the present instance has a flange $d$, which the end of clamp $d'$ engages and clamps by the action of the bolt $d^2$, passing through said clamp $d'$ and engaging a threaded aperture $d^3$ in the table or work-support B.

Any suitable means may be provided for reciprocating the work support or table B, that shown in the machine of the drawings being arranged and operating as follows:

The work support or table B is provided with a recess $b'$, as shown in Fig. 2, in which is fitted a block $b^2$, which upon its lower face is provided with a recess $b^3$, with which engages a tooth $b^4$, formed on a block $b^5$, fixed to the end of a shaft $b^6$, mounted to oscillate in a suitable bearing $b^7$ in the frame A. The oscillation of said shaft by means of the engagement of the tooth $b^4$ with the recess $b^3$ in the block $b^2$ causes a reciprocation of the work support or table B. Said shaft $b^6$ is oscillated by means of a lever $b^8$, which is fixedly secured to the outer end thereof, and in order that the motions of said table B shall be to a fixed point in one direction—that is, in a direction to carry the work away from the point of the tool—and shall be progressively advanced in the opposite direction, or in the direction to carry the work to the point of the tool $c$, whereby the groove shall be progressively cut by said tool $c$ to the required depth, the lever $b^8$ is conveniently actuated by the following mechanism: The lever $b^8$, as shown in Fig. 8, has upon its rear face a channel $b^9$, formed by the flanges $b^{10}$, in which is mounted to freely slide a block $b^{11}$, which is loosely held upon a pin or stud $b^{12}$. A lever $e$, similar to the lever $b^8$, is mounted to turn freely upon a shaft or stud $e'$, projected from the frame A, and it also has a channel $e^2$, formed by flanges $e^3$, in which is adapted to slide a block $e^4$, similar to block $b^{11}$, and in which is mounted the stud $b^{12}$, upon which the block $b^{11}$ is free to turn, as before stated. The stud $b^{12}$ forms a movable connection between the levers $b^8$ and $e$, movable along both levers toward and from their centers of motion, and by this arrangement it will be seen that a swinging movement given to the lever $e$ will, by means of the block $e^4$, pin $b^{12}$, and block $b^{11}$, impart a similar movement to the lever $b^8$, causing the lever $b^8$, by means of the shaft $b^6$, stud $b^4$, and recess $b^3$, to impart motion to the work support or table B. The lever $e$ is turned upon its fulcrum $e'$ by means of a link $e^5$, which is pivotally connected to an ear $e^6$ at the outer end of said lever, said link $e^5$ at its other end carrying a suitable cam-roll $e^7$, which engages a path-cam $e^8$, cut in the face of the gear $a^3$. It will thus be seen that a rotation of the gear $a^3$ will, by means of the path-cam $e^8$ and the link $e^5$, impart an up-and-down movement to the end of the lever $e$, and by means of the connection $b^{12}$ impart an up-and-down movement to the end of lever $b^8$, thus imparting movement to the work support or table B by means of the tooth $b^4$ and notch $b^3$, as before described. An inspection of Figs. 1 and 2 of the drawings will demonstrate the fact that an upward movement of the levers $e$ and $b^8$ will impart to the work support or table B a movement in the direction of the arrows shown on these figures, and will thus move the bearing D thereon in position to be engaged by the point of the cutting-tool $c$, and when thus moved the levers $e$ and $b^8$ will be in the position shown in Fig. 7. When the levers $e$ and $b^8$ are moved downward to the position shown in Fig. 6, the work support or table B will be moved in the opposite direction or in a direction to remove the work from contact with the point of the tool $c$.

It is desirable that the movement away from the point of the tool $c$ shall be always to a fixed point, while the movement of the work toward the tool $c$ shall be to a progressively-advanced point in order that, first, a tool-stock of large diameter as compared with the diameter of the bearing to be grooved may be employed to prevent the springing of the tool away from the work, and, second, that the groove cut in the bearing shall be progressively cut to the depth required, the point of the cutting-tool $c$ cutting into the inner surface of the bearing D at each downward movement thereof, the work-support and work being removed from engagement with the point of the tool while said tool is moved upward, preventing the tool $c$ from dragging along the work upon its return movement, which would rapidly dull the tool.

It will be noted that the relative position of the centers of motion of the levers $b^8$ and $e$ is such that the downward movement of the lever $e$, as produced by the extreme throw of the cam $e^8$, always brings the lever $b^8$ on center with the lever $e$ and the respective centers of motion of the levers $b^8$ and $e$ and the movable connection $b^{12}$ into alinement, and since this downward movement of the lever $e$ controls the downward movement of the lever $b^8$, which controls the movement of the work-support B, which carries the work D away from the tool $c$ and tends to approximate the back of the tool-stock C with the opposite side of the work D from that on which the cut is being made, it follows that the work is always brought to the same point with reference to the back of the tool-stock C and that the diameter of the tool-stock C as compared with the diameter of the work D is required to be reduced only sufficient to give clearance between the back of the tool-stock C and the work when the tool-stock C is first inserted in the work, thus permitting the use of a relatively large tool-stock, as hereinbefore suggested.

The upward throw of the lever $b^8$ controls the movement of the work support or table B, which advances the work D toward the tool $c$, and to secure a progressive advancement of the work toward the tool I provide means for moving the movable center $b^{12}$ toward the center of motion of the lever $b^8$, and thus increasing the throw of said lever $b^8$ as produced by the upward movement of the lever $e$, and to accomplish this result I have adopted in the embodiment of my invention shown in the drawings the following mechanism: Connected with the block $e^4$ is a rack $e^{6*}$, which meshes with and is actuated by a pinion $e^{7*}$, said pinion being formed upon a sleeve $e^{8*}$, adapted to freely turn upon the shaft $e'$. Upon the outer end of the sleeve $e^{8*}$ is fixedly secured a ratchet-wheel $e^9$. The ratchet-wheel $e^9$ is actuated by a spring-actuated pawl $e^{10}$, mounted upon a lever $e^{11}$, fulcrumed upon the sleeve $e^{8*}$, as clearly shown in Fig. 5, said lever being moved about its fulcrum by a link $e^{12}$, pivotally connected at $e^{13}$ to the outer end of said lever, said link at its lower end being pivotally connected to the short arm of a lever $e^{14}$, fulcrumed at $e^{15}$, the other or longer arm of said lever $e^{14}$ being connected to the end of the link $e^5$. The above arrangement is such that as the long arm of the lever $e^{14}$ is raised by the cam-path $e^8$ at the time said cam is acting to raise the end of levers $b^8$ and $e$ to move the work-support and the work thereon in the direction of the arrows in Figs. 1 and 2 the short arm of the lever $e^{14}$ will be depressed, thus pulling down upon the link $e^{12}$ and moving the lever $e^{11}$ about its fulcrum, thus causing the pawl $e^{10}$ to slip over the teeth of the ratchet $e^9$ and engage the same at a new position, and when the lever $e^{14}$ is moved in the opposite direction, or to the position shown in Fig. 1, the pawl $e^{10}$ will rotate the ratchet $e^9$ and the pinion $e^{7*}$ and by means of the rack $e^{6*}$ move the blocks $e^4$ and $b^{11}$ along the levers $e$ and $b^8$, moving the connection $b^{12}$ nearer the fulcrum $b^6$ of lever $b^8$, which upon the next rotation of the cam imparts an increased throw to the lever $b^8$, which causes the work-support and the work thereon to be moved nearer to the cutting-point of the tool, which will thus progressively cut the groove to the depth required.

In order to stop the cutting operation when the groove has been cut to the predetermined depth in the machine of the drawings, I have provided mechanism to stop the advancing movement of the work support or table. This mechanism, as shown in Figs. 3, 4, and 5, comprises a disk F, fitted loosely to the hub $e^{16}$ of the ratchet-wheel $e^9$ and fitting within the flanged periphery of said ratchet-wheel, which, as shown in Fig. 5, is undercut at $e^{17}$ for a purpose to be hereinafter referred to. The disk F at one portion of its periphery has a cam-shaped projection $f$, which projects beyond the teeth of the ratchet $e^9$ and which is of a length greater than the throw of the pawl $e^{10}$. Said disk F is arranged to be locked to the ratchet-wheel $e^9$ to rotate therewith, with the projection $f$ at any predetermined point along the periphery of said ratchet-wheel $e^9$.

The locking device shown in the machine of the drawings consists of a bolt $f'$, which passes through an aperture formed through the handle $f^2$ and through said disk F, which carries at its inner end a head $f^3$, arranged to engage the undercut $e^{17}$ of the ratchet-wheel $e^9$, and which at its outer end has a nut $f^4$, by means of which the head $f^3$ is brought into forcible contact with the outer wall of the undercut $e^{17}$. The pawl $e^{10}$ is of a width in excess of the width of the face of the ratchet $e^9$ and extends over the edge thereof to be engaged by the projection $f$ when the rotation of said ratchet $e^9$ shall have brought the projection $f$ under said point. It will thus be seen that when said projection $f$ shall have arrived at a point beneath the point $e^{10}$ it will cause said pawl to be raised from engagement with the teeth of the ratchet-wheel $e^9$, and that inasmuch as said projection is of a greater length than the stroke of the pawl $e^{10}$ said pawl cannot engage the teeth of the ratchet, but will ride back and forth upon the projection $f$, thus imparting no motion to the ratchet-wheel $e^9$ and stopping the advance of the blocks $e^4$ and $b^{11}$ and connection $b^{12}$ and the advance of the work support or table B and the work D thereon toward the cutting-point of the tool $c$, and until the machine is stopped and another piece of work placed in position and the disk F turned and reset for another operation of the machine the further reciprocation of the table or work-support will be to a fixed point in both directions. In order that the work support or table B may be adjusted to give a preliminary relative adjustment to the work and the tool $c$, the block $b^2$ is made adjustable in the recess $b'$ by means of a screw-threaded rod $t$, which engages a threaded bearing in the block $b^2$, said rod $t$ being fitted to turn in a bearing $t'$, formed in the work-support B, but held from longitudinal movement therein, said rod having a suitable handle $t^2$, by means of which the rod $t$ may be turned to move the table B along the guideway $a^4$ to thus preliminarily adjust the work and tool.

The operation of the machine of the drawings is as follows: A bearing, as D, being clamped upon the work-support B and the work-support and tool $c$ being preliminarily adjusted to bring the tool into the required position with reference to the work and the machine being set in operation by means of the levers $b^8$ and $e$ the work-support B is advanced toward the tool $c$ until the tool $c$ engages with the work to the depth required for the first cut of the tool $c$, and said work-support being held in such advanced position the tool descends, making the first cut. When the tool $c$ has reached the limit of its downward stroke and has finished the first cut, the levers $b^8$ and $e$ operate to move the work-support in an opposite direction into the retracted position, the work being then clear of the point of the tool $c$, and while held in such position the tool makes its return stroke and returns to a position to commence a second cut. This operation is continued until the groove has been cut to the required depth, when the projection $f$ comes in contact with the end of the pawl $e^{10}$ and stops the further progressive movement of the work toward the tool.

The operation of the ratchet $e^9$, as actuated by the pawl $e^{10}$, is such that each advancing movement of the work-table B carries the work to a point toward the tool in advance of the point reached by the preceding advancing movement by a distance equal to the depth of a single cut to be made by the tool.

To reset the machine for a new piece of work, the pawl $e^{10}$ is lifted and the ratchet-wheel $e^9$ turned backward, thus rotating the pinion $e^{7*}$, and by means of the rack $e^{6*}$ draws back the blocks $e^4$ and $b^{11}$ and the movable connection $b^{12}$ to the starting position.

Having thus described the machine of the drawings and its mode of operation, I claim as novel and desire to secure by Letters Patent of the United States—

1. In an oil-groove-cutting machine, the combination with a cutting-tool arranged to project within the bearing to be grooved, and a work-support upon which said bearing is held, of connected mechanisms acting to impart to said tool and work-support relative longitudinal and lateral movements, and constructed and arranged to cause said tool to cut a longitudinal groove upon the inner face of said bearing, of a length less than the length of said bearing, substantially as described.

2. In an oil-groove-cutting machine, the combination with a cutting-tool arranged to project within the bearing to be grooved, and a work-support upon which said bearing is held, of connected mechanisms operating to impart a longitudinal reciprocation to the tool, through said bearing, and a lateral reciprocation to the work-support, to move the inner face of said bearing toward and from the cutting end of said tool, substantially as described.

3. In an oil-groove-cutting machine, the combination with a cutting-tool arranged to project within the bearing to be grooved, and a work-support upon which said bearing is held, of connected mechanisms arranged to impart to said tool a longitudinal reciprocation through said bearing, and to reciprocate said work-support laterally, the movements of the work-support in one direction being to a fixed point and in the opposite direction to a progressively-advancing point, substantially as described.

4. In an oil-groove-cutting machine, the combination with a cutting-tool arranged to project within the bearing to be grooved, of connected mechanism constructed and arranged to impart to said cutting-tool and the bearing to be grooved relative longitudinal and lateral movements, and controlling the relative lateral movements of the tool and bearing to be grooved, so that the bearing to be grooved will be engaged by the cutting-point of the tool at a point removed from one end of the bearing, and the bearing be removed from the cutting-point of the tool before the cutting-tool reaches the other end of the bearing, substantially as described.

5. In an oil-groove-cutting machine, the combination with a cutting-tool arranged to project within the bearing to be grooved, and a work-support upon which said bearing is held, of means to impart to said work-support a reciprocating motion to a fixed point in one direction and to a progressively-advancing point in the opposite direction, substantially as described.

6. In an oil-groove-cutting machine, the combination with a cutting-tool arranged to project within the bearing to be grooved, and a work-support upon which said bearing is held, of connected mechanisms operating automatically to impart cutting movements to said tool and to advance and retract the work-support and work toward and from the cutting-point of the tool, substantially as described.

7. In an oil-groove-cutting machine, the combination with a work-support, of a lever and connected mechanisms to actuate the same, and means to impart to said lever a fixed throw in one direction and a progressively-increased throw in the opposite direction, substantially as described.

8. In an oil-groove-cutting machine, the combination with a work-support and a lever and connections for actuating the same, of means to actuate said lever, and a progressively-movable connection between said lever and its actuating means, substantially as described.

9. In an oil-groove-cutting machine, the combination with a work-support, and a lever and connections for actuating the same, of mechanism to actuate said lever, and means to progressively advance the point of connection between the lever and its actuating mechanism toward the center of movement of said lever, substantially as described.

10. In an oil-groove-cutting machine, the combination with a movable work-support, of a lever and connections for actuating the work-support, a second lever, a movable connection between the second lever and the lever which actuates the work-support, and means to actuate said second lever, substantially as described.

11. In an oil-groove-cutting machine, the combination with a work-support and a pair of oppositely-arranged levers for actuating the same, of a movable connection between said levers, and means to advance said movable connection away from the fulcrum of one lever and toward the fulcrum of the other, substantially as described.

12. In an oil-groove-cutting machine, the combination with the work-support, of a pair of oppositely-arranged levers for actuating the same, a pair of pivotally-connected sliding blocks connecting said levers, and means for advancing said blocks along the levers, substantially as described.

13. In an oil-groove-cutting machine the combination with a work-support, of a pair of oppositely-arranged levers for actuating the same, a pair of pivotally-connected blocks arranged to slide along said levers and a pawl-and-ratchet mechanism for advancing said blocks along the levers, substantially as described.

14. In an oil-groove-cutting machine, the combination with a pair of oppositely-arranged levers, and a pair of pivotally-connected sliding blocks connecting the same, of a rack and pinion for advancing said blocks along said levers, substantially as described.

15. In an oil-groove-cutting machine, the combination with a cutting-tool arranged to project within the bearing to be grooved, and a work-support upon which said bearing is held, of connected mechanism operating to impart a relative longitudinal movement to the tool and work-support, and a relative lateral reciprocation to a fixed point in one direction and to a progressively-advancing point in the opposite direction, substantially as described.

16. In an oil-groove-cutting machine, the combination with a cutting-tool arranged to project within the bearing to be grooved, and a work-support upon which said bearing is held, of connected mechanism acting to impart to said tool and work-support relative longitudinal and lateral movements constructed and arranged to advance said work toward the cutting-point of the tool and to cause said tool to cut a longitudinal groove upon the inner face of said bearing, of a length less than the length of said bearing, and means to stop the advance of the work at a predetermined point, substantially as described.

In testimony whereof I affix my signature in presence of two witnesses.

ALBERT H. MORTON.

Witnesses:
A. E. WHYTE,
JOHN J. COLLINS.